(12) United States Patent
Ode

(10) Patent No.: US 7,836,446 B2
(45) Date of Patent: Nov. 16, 2010

(54) CONFLICT MANAGEMENT PROGRAM, STORAGE MEDIUM FOR CONFLICT MANAGEMENT PROGRAM STORAGE, CONFLICT MANAGEMENT METHOD, AND ELECTRONIC APPARATUS FOR TERMINAL DEVICES

(75) Inventor: Naoki Ode, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 1070 days.

(21) Appl. No.: 10/560,026

(22) PCT Filed: Jun. 9, 2004

(86) PCT No.: PCT/JP2004/008408

§ 371 (c)(1),
(2), (4) Date: Dec. 8, 2005

(87) PCT Pub. No.: WO2004/111848

PCT Pub. Date: Dec. 23, 2004

(65) Prior Publication Data

US 2006/0129600 A1    Jun. 15, 2006

(30) Foreign Application Priority Data

Jun. 10, 2003  (JP) ................. P2003-165742

(51) Int. Cl.
*G06F 9/46* (2006.01)

(52) U.S. Cl. ............... 718/100; 718/104; 718/102; 718/105

(58) Field of Classification Search .......... 718/102–105
See application file for complete search history.

(56) References Cited

U.S. PATENT DOCUMENTS

| 5,838,968 A * | 11/1998 | Culbert ............... 718/104 |
| 6,108,683 A * | 8/2000 | Kamada et al. ......... 718/103 |
| 6,260,058 B1 * | 7/2001 | Hoenninger et al. ..... 718/107 |
| 6,668,269 B1 * | 12/2003 | Kamada et al. ......... 718/103 |
| 7,260,728 B2 * | 8/2007 | Chang et al. .......... 713/300 |
| 7,386,853 B2 * | 6/2008 | Hanzawa .............. 718/108 |

(Continued)

FOREIGN PATENT DOCUMENTS

EP    0 964 332    12/1999

(Continued)

*Primary Examiner*—Meng-Ai An
*Assistant Examiner*—Abdullah Al Kawsar
(74) *Attorney, Agent, or Firm*—Frommer Lawrence & Haug LLP; William S. Frommer; Ellen Marcie Emas

(57) ABSTRACT

Disclosed is a conflict management program that ensures that an application can be programmed without having to consider a conflict with another application. An application manager (25) is provided with an execution list (61) for registering a currently executed application and an execution wait list (62) for registering an application on standby. In the event of an application conflict, an application management block (64) references a conflict condition table that relates to the state of the currently executed application and to the state of the application on standby, which are registered in each list (61) and (62), and determines the states (running, terminated, waiting for execution, etc.) to which the applications should switch in accordance with the priorities of the current states of the applications. An application control block (65) respectively places the applications in the states determined by the application management block (64), thereby exercising application conflict management.

20 Claims, 9 Drawing Sheets

| STATUS\APPLICATION | FIRST STATE | SECOND STATE | THIRD STATE | FOURTH STATE | Nth STATE |
|---|---|---|---|---|---|
| TELERHONE | STARTUP UNACHIEVABLE | STARTUP UNACHIEVABLE | STARTUP UNACHIEVABLE | STARTUP UNACHIEVABLE | STARTUP UNACHIEVABLE |
| STANDBY | RUNNING SIDE STANDBY | RUNNING SIDE STANDBY | RUNNING SIDE TERMINATED | RUNNING SIDE TERMINATED | RUNNING SIDE TERMINATED |
| ADDRESS BOOK | RUNNING SIDE STANDBY | RUNNING SIDE STANDBY | RUNNING SIDE STANDBY | RUNNING SIDE STANDBY | RUNNING SIDE TERMINATED |
| E-MAIL | INTERRUPTING SIDE STANDBY | STARTUP ACHIEVABLE | RUNNING SIDE STANDBY | RUNNING SIDE STANDBY | RUNNING SIDE TERMINATED |
| BROWSER | STARTUP ACHIEVABLE | STARTUP ACHIEVABLE | RUNNING SIDE STANDBY | STARTUP ACHIEVABLE | RUNNING SIDE TERMINATED |
| MOTION PICTURE PLAYER | STARTUP ACHIEVABLE | STARTUP ACHIEVABLE | RUNNING SIDE STANDBY | RUNNING SIDE STANDBY | STARTUP ACHIEVABLE |
| NOTEPAD | STARTUP ACHIEVABLE | STARTUP ACHIEVABLE | RUNNING SIDE STANDBY | RUNNING SIDE TERMINATED | INTERRUPTING SIDE STANDBY |

U.S. PATENT DOCUMENTS

| | | | |
|---|---|---|---|
| 2002/0007408 A1* | 1/2002 | Kalhour | 709/225 |
| 2002/0037753 A1 | 3/2002 | Shitahaku | |
| 2003/0110202 A1* | 6/2003 | Shitahaku | 709/102 |

FOREIGN PATENT DOCUMENTS

| | | |
|---|---|---|
| JP | 10-289114 | 10/1998 |
| JP | 10-333926 | 12/1998 |
| JP | 2000-222224 | 8/2000 |
| JP | 2002-111805 | 4/2002 |
| JP | 2002-175191 | 6/2002 |
| JP | 2003-177926 | 6/2003 |
| WO | WO 01 04743 | 1/2001 |

* cited by examiner

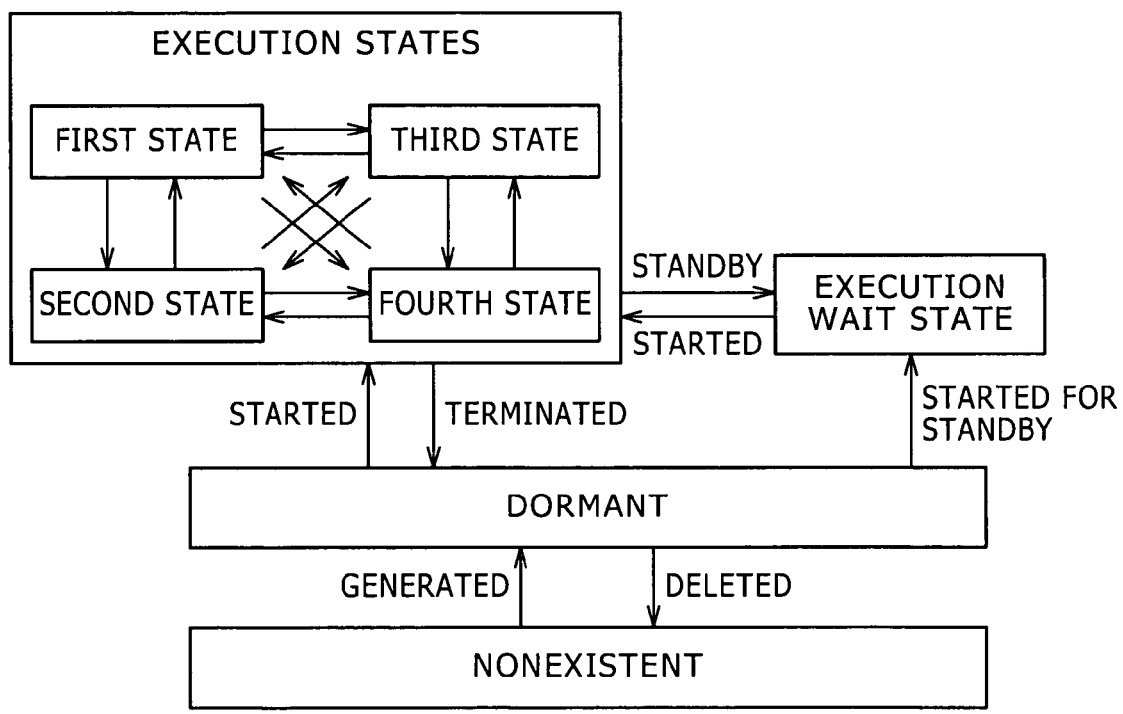
F I G . 5

| STATUS / APPLICATION | FIRST STATE | SECOND STATE | THIRD STATE | FOURTH STATE | Nth STATE |
|---|---|---|---|---|---|
| TELERHONE | STARTUP UNACHIEVABLE | STARTUP UNACHIEVABLE | STARTUP UNACHIEVABLE | STARTUP UNACHIEVABLE | STARTUP UNACHIEVABLE |
| STANDBY | RUNNING SIDE STANDBY | RUNNING SIDE STANDBY | RUNNING SIDE TERMINATED | RUNNING SIDE TERMINATED | RUNNING SIDE TERMINATED |
| ADDRESS BOOK | RUNNING SIDE STANDBY | RUNNING SIDE STANDBY | RUNNING SIDE STANDBY | RUNNING SIDE STANDBY | RUNNING SIDE TERMINATED |
| E-MAIL | INTERRUPTING SIDE STANDBY | STARTUP ACHIEVABLE | RUNNING SIDE STANDBY | RUNNING SIDE STANDBY | RUNNING SIDE TERMINATED |
| BROWSER | STARTUP ACHIEVABLE | STARTUP ACHIEVABLE | RUNNING SIDE STANDBY | STARTUP ACHIEVABLE | RUNNING SIDE TERMINATED |
| MOTION PICTURE PLAYER | STARTUP ACHIEVABLE | STARTUP ACHIEVABLE | RUNNING SIDE STANDBY | RUNNING SIDE STANDBY | STARTUP ACHIEVABLE |
| NOTEPAD | STARTUP ACHIEVABLE | STARTUP ACHIEVABLE | RUNNING SIDE STANDBY | RUNNING SIDE TERMINATED | INTERRUPTING SIDE STANDBY |

FIG. 8

EXECUTION LIST  61

| APPLICATION ID |
|---|
| APPLICATION NAME |
| TASK ID |
| STATUS |

| APPLICATION ID |
|---|
| APPLICATION NAME |
| TASK ID |
| STATUS |

. . .

| APPLICATION ID |
|---|
| APPLICATION NAME |
| TASK ID |
| STATUS |

FIG. 9

EXECUTION WAIT LIST  62

| APPLICATION ID |
|---|
| APPLICATION NAME |
| TASK ID |
| STATUS |

| APPLICATION ID |
|---|
| APPLICATION NAME |
| TASK ID |
| STATUS |

. . .

| APPLICATION ID |
|---|
| APPLICATION NAME |
| TASK ID |
| STATUS |

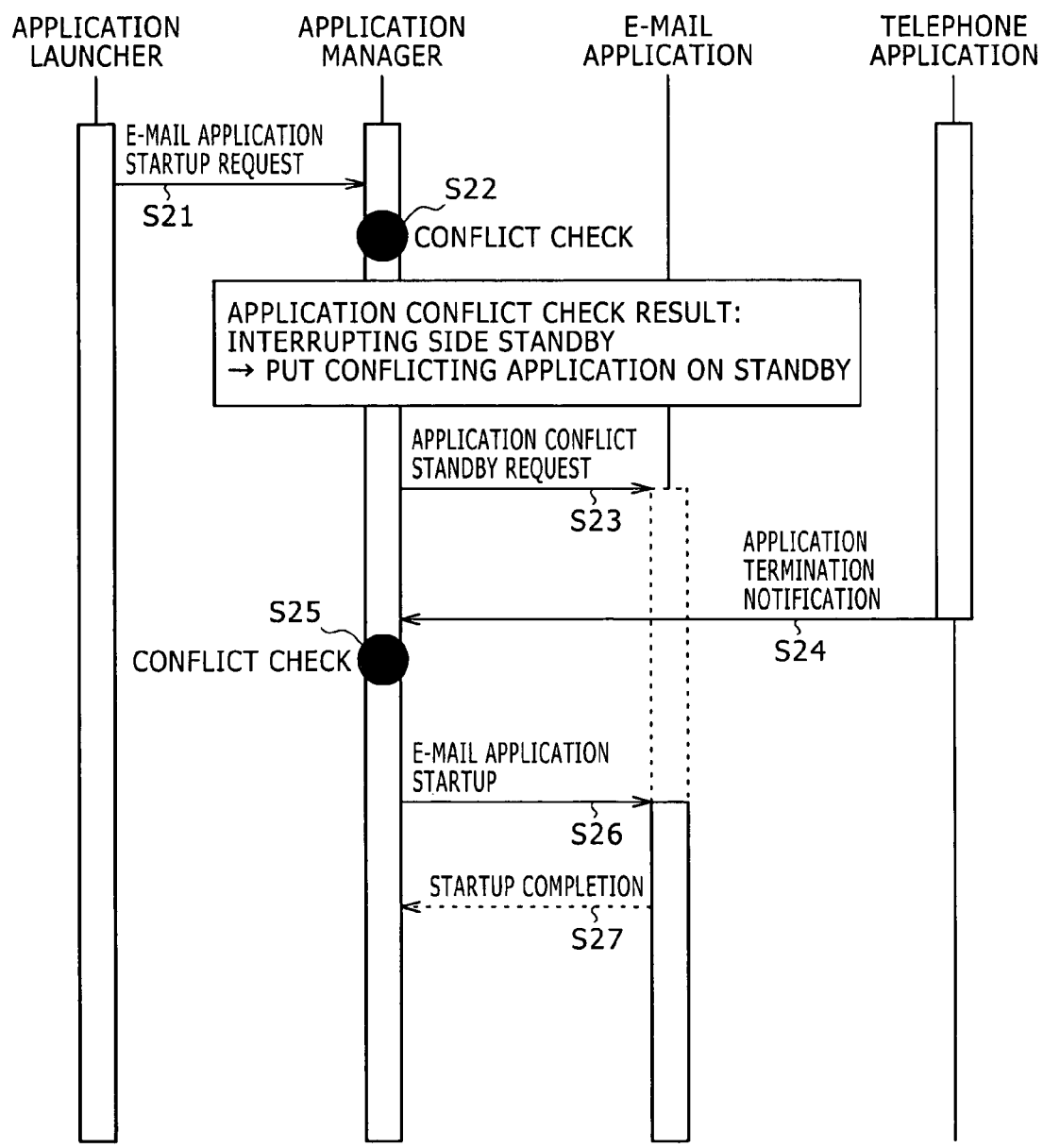

CONFLICT MANAGEMENT PROGRAM, STORAGE MEDIUM FOR CONFLICT MANAGEMENT PROGRAM STORAGE, CONFLICT MANAGEMENT METHOD, AND ELECTRONIC APPARATUS FOR TERMINAL DEVICES

TECHNICAL FIELD

The present invention relates to a conflict management program a storage medium for conflict management program storage, a conflict management method, and an electronic apparatus suitable for use in a cellular phone, PHS (Personal Handyphone System) phone, PDA (Personal Digital Assistant or Personal Data Assistant), personal computer, or other terminal device.

BACKGROUND ART

Present-day cellular phones generally exercise application execution management in a single-tasking manner.

If, for instance, an instruction is issued to execute an application while another application is being executed, the priorities of these applications are detected. A low-priority application is aborted to launch a high-priority application. Application conflict management is exercised in this manner.

If there is an incoming call while an e-mail message is being created, an application for e-mail message creation is aborted to launch an incoming call processing application and perform an incoming call handling process. The reason is that the incoming call processing application has a higher priority than the e-mail message creation application. Consequently, the e-mail message creation process is stopped so as to preferentially process the incoming call.

Meanwhile, personal computers, which have a higher information processing capability (performance) than cellular phones, generally exercise application execution management in a multi-tasking manner.

If an application conflict occurs, the personal computers exercise either of the following conflict management methods.

In a first conflict management method, the operating system (OS) changes the priority of a currently executed application (lowers the priority) without regard to the current state of the currently executed application, and preferentially executes another application whose execution is dictated later.

More specifically, if, for instance, the user issues an instruction for launching word-processing software while spreadsheet software is being executed, the OS puts the spreadsheet software on standby and preferentially launches the word-processing software. This ensures that a document can be created with the word-processing software while a table creation operation performed by the spreadsheet software is interrupted.

In a second conflict management method, a conflicting application is predicted when an application is programmed, and the latter application is programmed so that the two applications communicate with each other in the event of a conflict and that one of the two applications changes its priority in accordance with the state of the other application.

When the second conflict management method is used, the priorities of the conflicting applications are determined in accordance with the communication established between the conflicting applications. It means that the applications autonomously exercise conflict management.

A related art concerning the above application management is disclosed by Japanese Translations of PCT for Patent No. 2003-504753.

As described earlier, present-day cellular phones exercise application conflict management in a single-tasking manner. However, it is predicted that future cellular phones will exercise application execution management in a multi-tasking manner.

If the aforementioned first or second management method is used for conflict management purposes, the following problems arise.

When conflict management is exercised by the aforementioned first conflict management method, the OS aborts a currently executed application and executes a later-designated application without recognizing the current state of the currently executed application. Therefore, when the application that was put on standby (previously executed application) is resumed upon termination of execution of the later-designated application, the application that was put on standby might improperly run (the operation of the application that was put on standby cannot be guaranteed).

When conflict management is exercised by the aforementioned second conflict management method, it is necessary to program an application while predicting all conflicting applications. Such prediction is difficult when the number of conflicting applications increases or when the system becomes complicated.

If a change occurs in the specifications for an application while the aforementioned second conflict management method is used, it is necessary to change the specifications for all the other relevant applications accordingly. Thus, it is anticipated that it would be necessary to perform a troublesome task. More specifically, it would be necessary to reprogram and reinstall a number of applications (for applying changes to application designs and implementations).

The use of conflict management methods in related art, which provide multi-tasking, makes it necessary to consider the above circumstances and renders software development difficult.

DISCLOSURE OF INVENTION

The present invention has been made in view of the above circumstances and provides a conflict management program, storage medium for conflict management program storage, conflict management method, and electronic apparatus for making software development easy. More specifically, it is an object of the present invention to provide a conflict management program, storage medium for conflict management program storage, conflict management method, and electronic apparatus that guarantee the operation of an application that is put on standby, make it possible to program (design) an application without having to consider a conflicting application, and does not require a specification change in one application to call for a specification change in the other applications.

The present invention is such that when execution request receiver means receives a task execution request, conflict detection means references an active task list in which an active task is registered, and checks for a conflict between tasks.

When the conflict detection means detects a conflict between tasks, transition state determination means references a conflict condition table that stores the states to which the conflicting tasks should switch, and determines the state to which the task related to the task execution request should switch and the state to which the task registered in the active task list should switch.

State transition means then causes the task related to the execution request and the task registered in the active task list to respectively switch to the states determined by the transition state determination means.

In this manner, the present invention assures that the execution of a task waiting to be executed resumes.

The present invention also makes it possible to program a task without having to consider its conflict with the other tasks.

Further, if a change occurs in the specifications for a task, it is necessary to apply such a specification change to the affected task only because the task can be programmed without having to consider a conflict with the other tasks.

Therefore, even when a specification change occurs in a task, the present invention makes it possible to avoid a troublesome task. More specifically, it is not necessary to change the specifications for all the other tasks accordingly or reprogram and reinstall a number of tasks (for applying changes to task designs and implementations).

In addition, the present invention makes software development considerably easy because a task can be programmed without having to consider a conflict with the other tasks.

The term "task" refers not only to a task but also to any application or process that is executed by a computer for information processing purposes.

The term "active task" refers not only to a currently executed task but also to an active task that is waiting to be executed.

BRIEF DESCRIPTION OF DRAWINGS

FIG. 5 is a schematic diagram illustrating the state transition of applications.

FIG. 7 shows an example of a conflict condition table that is provided in a cellular phone according to one embodiment of the present invention.

FIG. 8 shows an execution list that is provided in an application list of the application manager.

FIG. 9 shows an execution waiting list that is provided in the application list of the application manager.

FIG. 11 is a timing diagram illustrating a conflict management operation that the application manager performs when an e-mail application execution request is issued while a telephone application is being executed.

BEST MODE FOR CARRYING OUT THE INVENTION

The present invention can be applied, for instance, to a cellular phone. The cellular phone according to the present invention is used in a mobile communication system having a so-called home memory function, location registration function, tracking exchange function (automatic tracking routine), handover function, and the like.

In a service area of the mobile communication system, a plurality of base stations are distributed. The base stations form cells, which are wireless communication areas. Each base station assigns a wireless channel to a cellular phone positioned within the local wireless communication area, communicates with the cellular phone via the wireless channel, and synchronizes with the cellular phone.

When the cellular phone moves from one cell to another during a communication, the mobile communication system exercises the so-called handover function to maintain communication. More specifically, the mobile communication system switches the base station for communication from a base station in the current cell to a base station in the new cell.

Figure 1:
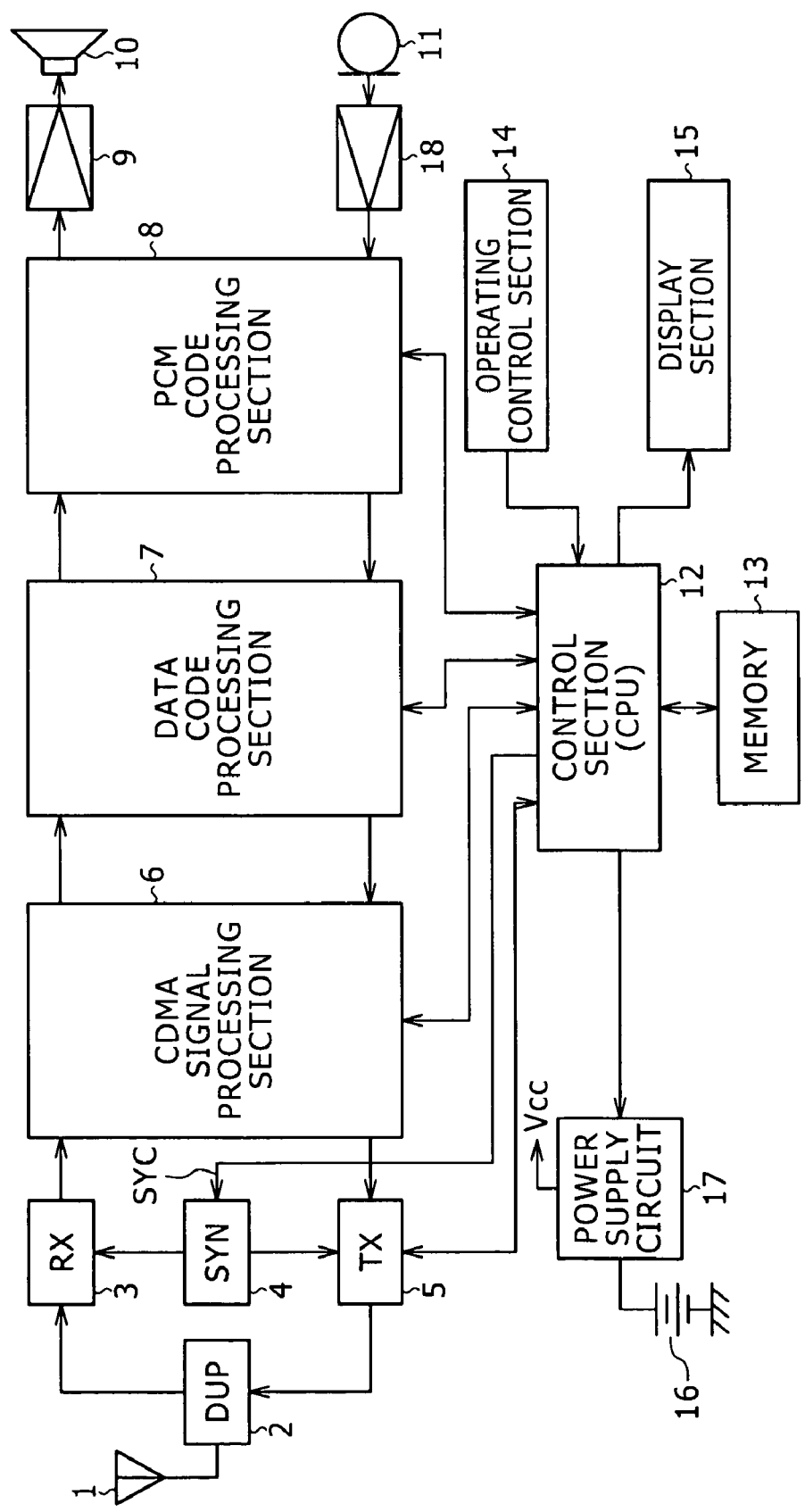
FIG. 1 is an overall block diagram illustrating a cellular phone according to one embodiment of the present invention.

FIG. 1 is an overall block diagram illustrating a cellular phone according to a first embodiment of the present invention, which is used in a CDMA (Code Division Multiple Access) mobile communication system.

[Receiver Operation]

Referring to FIG. 1, a radio-frequency signal transmitted from a base station is received by an antenna 1 and then supplied to a receiver circuit 3 (RX) via an antenna duplexer 2 (DUP). The RX 3 mixes the radio-frequency signal with a receiver local oscillation signal that is supplied from a frequency synthesizer 4 (SYN), and performs a frequency conversion process to convert the radio-frequency signal to an intermediate frequency signal.

The frequency of the receiver local oscillation signal, which is output from the SYN 4, is set by a control signal (SYC) that is fed from a control section 12 (CPU).

The aforementioned receiver intermediate frequency signal is subjected to orthogonal demodulation in a CDMA signal processing section 6, and then subjected to back diffusion by a diffusion code (PN code) that is assigned to a receiver channel. The receiver intermediate frequency signal is then converted to demodulated data that is in a predefined format according to a data rate. The obtained demodulated data is supplied to a data code processing section 7, and a receiver data rate, which is contained in the receiver data to indicate the data rate, is supplied to the CPU 12.

The data code processing section 7 performs a decompression process on the demodulated data, which is supplied from the CDMA signal processing section 6, in accordance with the receiver data rate that is reported by the CPU 12. The data code processing section 7 then performs a decoding process, which is based, for instance, on Viterbi decoding, and an error correction/decoding process to form a reception baseband data.

The CPU 12 controls a PCM code processing section 8 so that the signal process performed by the PCM code processing section 8 varies with the type of audio signal communication (voice communication/data communication).

In voice communication, the PCM code processing section 8 receives the receiver data, which is supplied from the data code processing section 7, and performs a PCM decoding process on the receiver data to form an analog call receiver signal. The analog call receiver signal is amplified by a call receiver amplifier 9 and output from a loudspeaker 10.

In data communication, the PCM code processing section 8 receives the receiver data from the data code processing section 7, and supplies the receiver data to the CPU 12. The CPU 12 stores the receiver data in a memory 13 for control purposes. Further, the CPU 12 outputs the receiver data to a PDA (Personal Digital Assistant) or notebook computer as needed via an external interface.

[Sender Operation]

In voice communication, the voice of a speaker is collected by a microphone 11 and amplified to an appropriate level by a voice amplifier 18. The PCM code processing section 8 then performs a PCM encoding process. The data derived from the PCM encoding process is supplied to the data code processing section 7 as the sender data.

When image data or other data is supplied from the aforementioned PDA, notebook computer, camera, or other external device via the external interface, the data is forwarded to the CPU 12. The CPU 12 supplies the data to the data code processing section 7 via the PCM code processing section 8.

In voice communication, the data code processing section 7 detects the amount of energy in an input voice in accordance with the sender voice data supplied from the PCM code processing section 8. Next, the data code processing section 7 determines the data rate in accordance with the detection result. The data code processing section 7 also performs a compression process on the sender data to obtain a burst signal that is formatted in accordance with the determined data rate. Further, the data code processing section 7 performs an error correction/encoding process and then supplies the resultant signal to the CDMA signal processing section 6.

In data communication, the data code processing section 7 performs a compression process on the sender data, which is supplied from the PCM code processing section 8, to obtain a burst signal that is formatted according to a predetermined data rate, performs an error correction/encoding process, and supplies the resultant signal to the CDMA signal processing section 6.

In voice communication and in data communication, the information indicating a sender data rate, which is the aforementioned data rate, is supplied to the CPU 12.

The CDMA signal processing section 6 performs a diffusion process on the burst signal compressed by the data code processing section 7 by using a PN code that is assigned to a sender channel. The resultant diffusion-encoded sender signal is subjected to an orthogonal modulation process. The resultant orthogonal modulated signal is then supplied to a sender circuit 5 (TX).

The sender circuit 5 mixes the orthogonal modulated signal with a sender local oscillation signal, which is supplied from the SYN 4, to achieve conversion into a radio-frequency signal. Next, the sender circuit 5 performs a high-frequency amplification process only on a valid portion of the radio-frequency signal in accordance with the sender data rate that is set by the CPU 12. The resultant amplified signal is supplied to the antenna 1 via the DUP 2 as a sender radio-frequency signal. The sender radio-frequency signal is then burst transmitted from the antenna 1 to a base station.

An operating control section 14 (KEY) is provided with various keys, including dial keys, call origination key, power key, end key, volume adjustment key, and mode selection key.

A display section 15 is provided with a liquid-crystal display (LCD), which displays, for instance, a recipient's phone number, the operating status of the apparatus, and received data. The display section 15 also includes a light-emitting section (LED and the like) for indicating a call origination/call receiver operation, a recharging operation for a rechargeable battery 16, and the like.

A power supply circuit 17 generates a predetermined operating supply voltage Vcc in accordance with power that is stored in the battery 16, and supplies the generated operating supply voltage to various circuits of the cellular phone.

[Configuration of Essential Parts]

Figure 2:
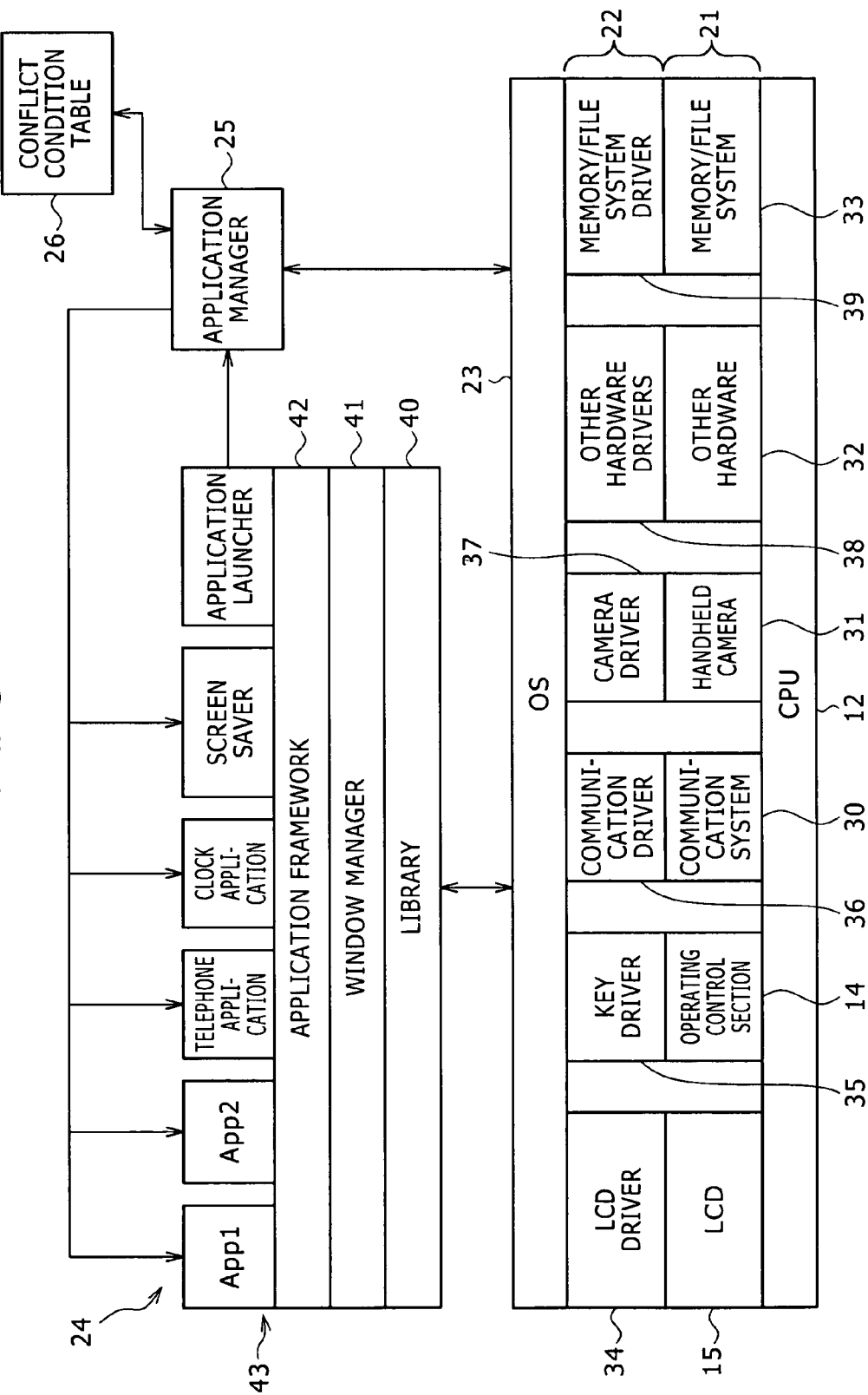
FIG. 2 is a functional block diagram illustrating the essential parts of a cellular phone according to one embodiment of the present invention.

FIG. 2 shows the essential parts configuration of the cellular phone according to the present embodiment. As indicated in FIG. 2, the cellular phone according to the present embodiment includes a hardware group 21 whose operations are controlled by the CPU 12, a driver group 22 that includes a plurality of drivers corresponding to the hardware in the hardware group, an operating system 23 (OS), an application group 24 that includes a plurality of applications, an application manager 25 for exercising application conflict management, and a conflict condition table 26 for storing information that indicates, for instance, whether conflicting applications should start in various operating states of applications.

The hardware group 21 includes the operating control section 14; the display section 15; a communication system 30, which includes, for instance, the DUP 2, RX 3, CDMA signal processing section 6, and data code processing section 7; a handheld camera 31; other hardware 32 such as the light-emitting section (LED) and audio device; and a memory/file system 33, which includes, for instance, the memory 13.

The driver group 22 includes an LCD driver 34 (LCD Task/Driver) for exercising drive control over the display section 15, a key driver 35 (KEY Driver) for exercising drive control over the operating control section 14, a communication driver 36 for exercising drive control over the communication system, a camera driver 37 for exercising drive control over the handheld camera 31, the other hardware drivers 38 for exercising drive control over the aforementioned other hardware, and a memory/file system driver 39 for exercising drive control over the memory/file system 33.

The application group 24 includes libraries 40 that are data shared by the applications, a window manager 41, an application framework 42 that provides basic data for the applications, and various applications 43 such as a telephone application, a clock application, a screen saver, and an application launcher.

"App1" and "App2," which are shown in FIG. 2, represent any user-defined applications.

In FIG. 2, the CPU 12, operating control section 14, display section 15, communication system 30, handheld camera 31, other hardware 32, and memory/file system 33 are counted as the hardware. Items 23 to 26 (OS 23 to conflict condition table 26) are counted as the software. The software is stored, for instance, in the memory 13, which is shown in FIG. 1.

(Functional Configuration of Various Applications)

Figure 3:
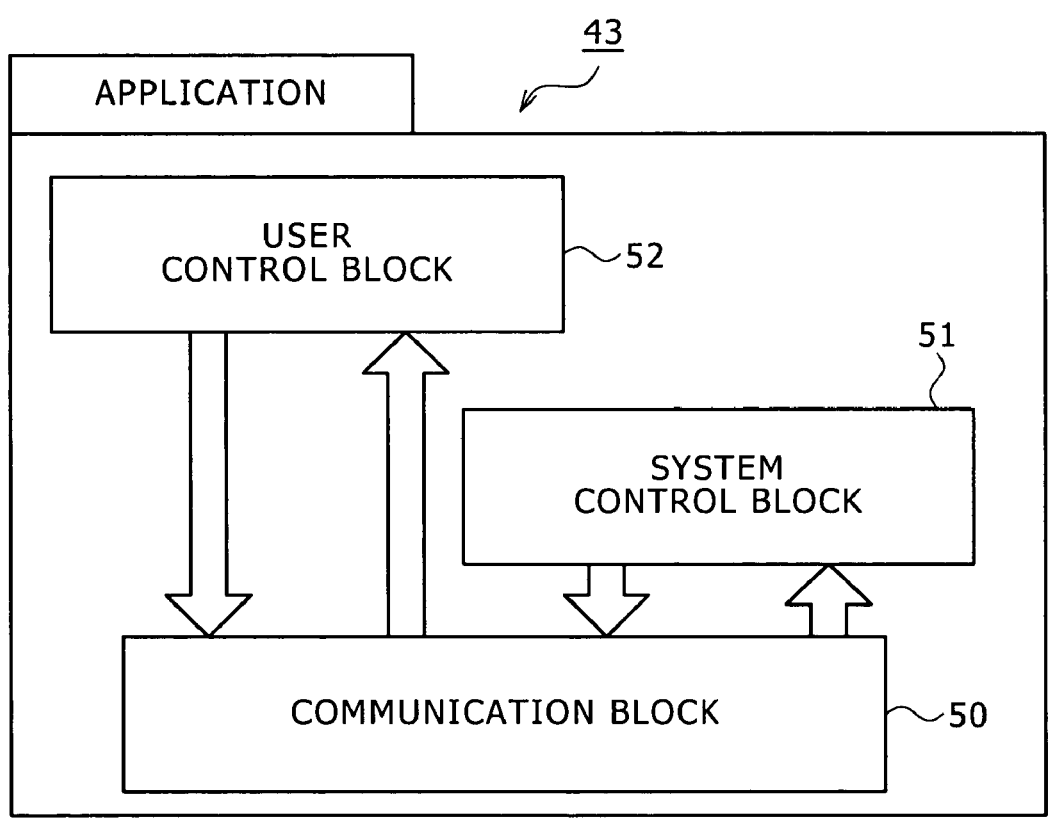
FIG. 3 is a functional block diagram illustrating the applications to be executed by a cellular phone according to one embodiment of the present invention.

FIG. 3 is a functional block diagram illustrating the various applications 43, which belong to the application group 24. As shown in FIG. 3, each application 43 includes a system control block 51. The system control block communicates with the application manager 25 via a communication block 50, which serves as an interface for the application. Each application 43 also includes a user control block 52, which provides application operations such as a telephone communication and cellular phone mail creation.

As described later, the system control block 51 communicates with the application manager 25 so that the application manager 25 controls the operating status (started, standby for startup, etc.) of each application 43.

(Functional Configuration of Application Manager)

Figure 4:
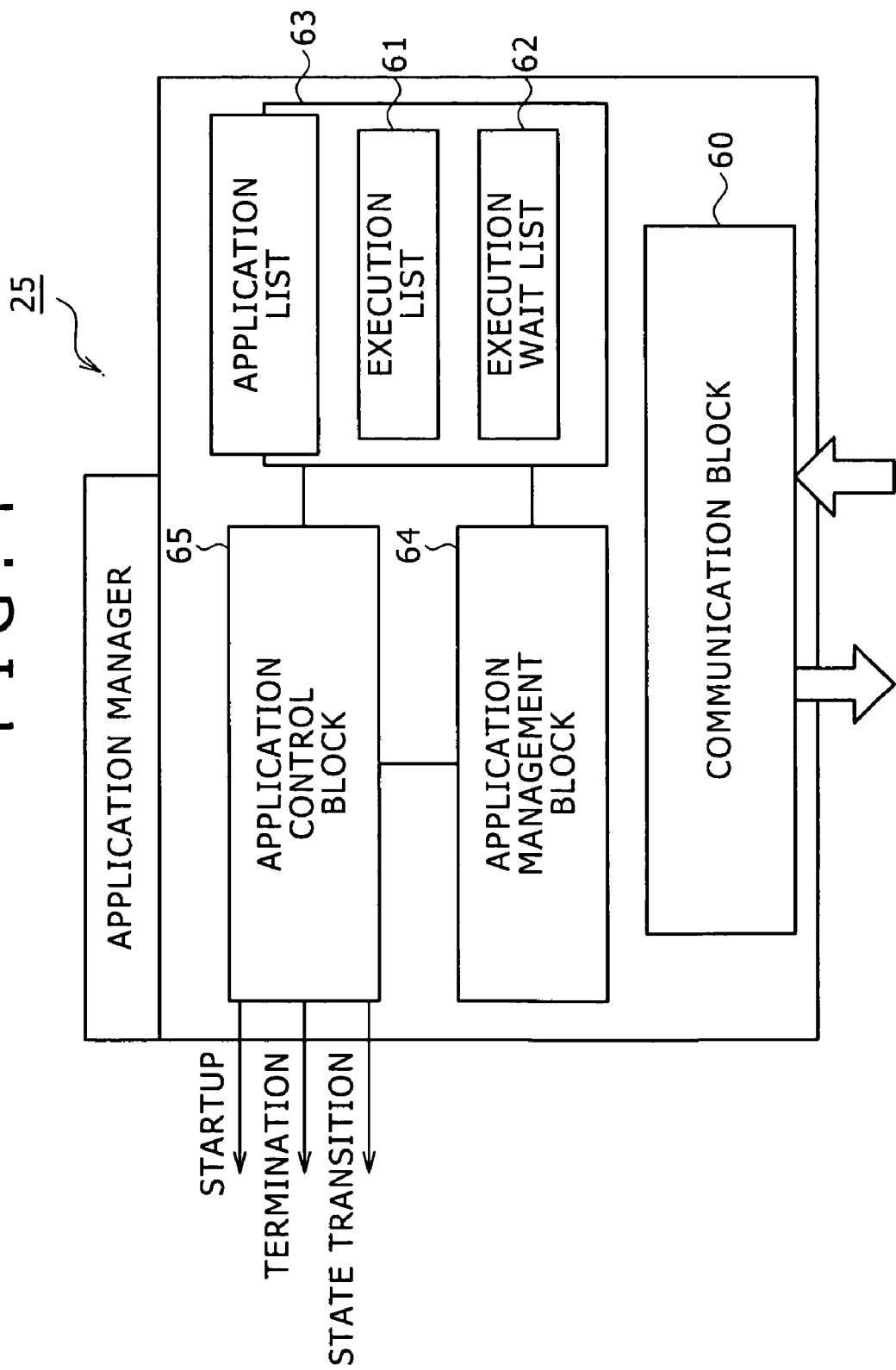
FIG. 4 is a functional block diagram illustrating an application manager that is provided in a cellular phone according to one embodiment of the present invention.

FIG. 4 is a functional block diagram of the application manager 25. As shown in FIG. 4, the application manager 25 includes a communication block 60, which serves as an interface for the application manager 25. The application manager 25 also includes an application list 63. The application list 63 includes an execution list 61, which stores data indicating a currently executed application, and an execution wait list 62, which stores data indicating an application that is waiting to be executed.

Further, the application manager 25 includes an application management block 64 and an application control block 65. The application management block 64 exercises application conflict management in accordance with the lists 61, 62 stored in the application list. The application control block 65 exercises control over each application's startup, termination, state transition, and the like in accordance with conflict management exercised by the application management block 64.

(Overview of Application Manager Operation)

When applications conflict with each other, the application manager 25 determines the application to be executed, the application to be started, the application that waits to be started, and the application that goes on standby for execution in accordance with the priorities, current states, and other conditions of the applications, and registers the results in the lists 61, 62 accordingly.

When, for instance, the state of a registered application changes or a new application startup request is generated, the application manager 25 restructures the lists 61, 62, and then exercises application conflict management while referencing the restructured lists 61, 62.

(State Transitions of Applications)

To provide a more detailed description, FIG. 5 schematically shows various states of an application. As is obvious from FIG. 5, the application may be nonexistent or dormant. When the application is nonexistent, it is not stored, for instance, in the cellular phone (or a memory that stores the application is not attached to the cellular phone). When the application is dormant, it is stored in the cellular phone, but not designated for execution.

Further, the application may be currently executed or waiting to be executed.

An application that is not existent in the cellular phone can be generated as indicated in FIG. 5 when it is installed in the cellular phone or a memory storing it is attached to the cellular phone. This application is then rendered dormant (existent in the cellular phone but not executed or designated for execution).

When the user or another application issues an instruction for executing such a dormant application, a state transition occurs so that the dormant application becomes executed or waits to be executed as indicated in FIG. 5 ("started" or "started for standby").

When the status of the dormant application is changed so that it is executed, the application manager 25 registers the executed application in the execution list 61.

When the status of the dormant application is changed so that it waits to be executed, the application manager 25 registers the application, which waits to be executed, in the execution wait list 62.

The status of the executed application changes in accordance with its operating state and the like.

If, for instance, the above application is a telephone application, its status changes a time interval between the start and end of communication. More specifically, the telephone application may be in a connection state in which a process is performed to establish the connection to a call destination, in a communication state in which a process is performed, for instance, to handle the voice for communication after connection establishment, in a hold state in which a call is put on hold when an instruction is issued during a telephone call to put the call on hold, or in a break state in which a process is performed to break the established connection when an instruction is issued to terminate the telephone call.

The first to fourth states and arrows interconnecting these states, which are indicated to illustrate the execution state in FIG. 5, represent the state transitions that may occur during application execution.

The application manager 25 references the applications registered in the execution list 61 and execution wait list 62 when it receives an application startup request, detects the termination of a currently executed application, or detects a state transition in a currently executed application. In accordance with the priority and status of each application, the application manager 25, for example, puts a currently executed application on standby. Further, the application manager 25 exercises conflict management, for instance, by executing an application that has waited to be executed or an application for which a startup request is newly issued or by putting an application for which a startup request is newly issued on standby for startup.

An application whose execution is terminated becomes dormant as represented by the term "terminated" in FIG. 5. When a dormant application is deleted, it becomes nonexistent in the cellular phone.

[Conflict Management Operation by Application Manager]

The conflict management operation performed by the application manager 25 will now be described with reference to a flowchart in FIG. 6.

Figure 6:
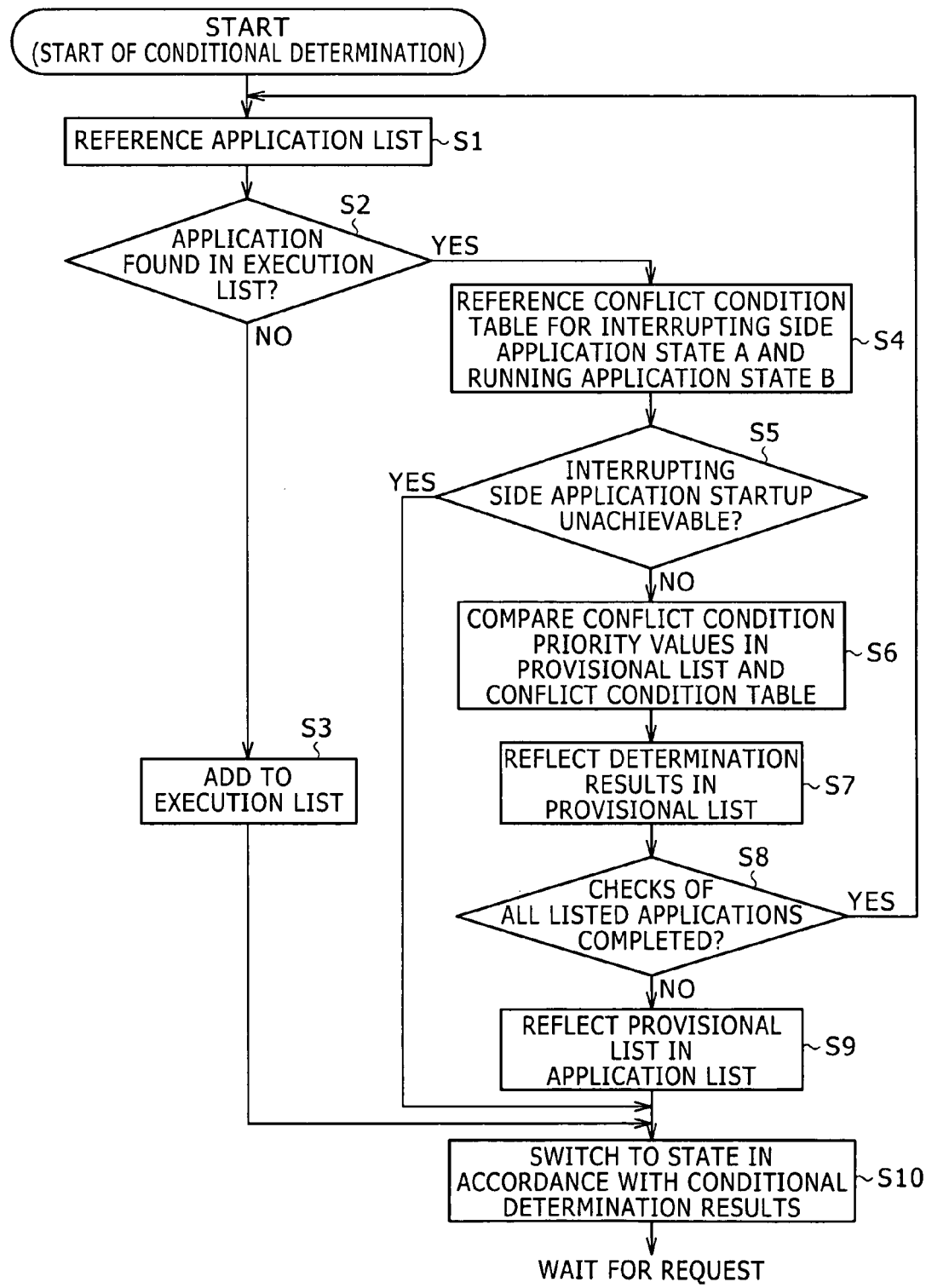
FIG. 6 is a flowchart illustrating an application conflict management operation that is performed by the application manager provided in a cellular phone according to one embodiment of the present invention.

When the application manager 25 receives an application startup request, detects the termination of a currently executed application, or detects a state transition in a currently executed application, the flowchart in FIG. 6 starts (to begin a conditional determination process) and executes steps S1 and beyond.

In step S1, the application management block 64 of the application manager 25 references the application list 63 because the application manager 25 detects an application startup request, the termination of a currently executed application, or a state transition in a currently executed application.

In step S2, the application management block 64 checks for an application registered in the execution list 61 within the application list 63 for the purpose of determining whether any currently executed application exists.

If the application management block 64 does not find any currently executed application when it references the execution list 61 (no application is registered in the execution list 61), step S3 is performed to register an application for which a startup request is generated in the execution list 61 or check applications registered in the execution wait list 62 (applications waiting to be executed), select the application to be executed, and register the selected application in the execution list 61.

After the application is registered in the execution list 61 by the application management block 64 as described above, the application control block 65 performs step S10 to place the application registered in the execution list 61 in an execution state.

Thus, the application for which the startup request is generated or the application waiting to be executed is executed.

If it is found in step S2 that more than one application is registered in the execution list 61, the application management block 64 performs step S4 to run a conflict check by referencing the conflict condition table 26 shown in FIG. 2.

(Conflict Condition Table)

The conflict condition table 26 for use in the conflict check is a table in which various states of a currently executed application correlate to various states of a conflicting application. The conflict condition table 26 also indicates the states to which the currently executed application and conflicting application should switch in the event of an application conflict.

Therefore, when the total number of applications installed in the cellular phone according to the present embodiment is N and the number of states possessed by the applications is M, the total number of conflict condition tables provided in the cellular phone according to the present embodiment is N×M.

FIG. 7 shows an example of the conflict condition table 26 that is referenced when the telephone application is currently executed.

In FIG. 7, the first to nth states (n is a natural number) represent the aforementioned connection state, communication state, hold state, or other states. In FIG. 7, "Telephone," "Standby," . . . "Notepad" are conflicting applications whose states are referenced.

The meanings of the "Startup unachievable," "Interrupting side standby," "Running side standby," and "Running side terminated" states are described below:

"Startup unachievable"—An application for which a startup request is generated cannot be started. Therefore, the startup request is canceled.

"Interrupting side standby"—An application for which a startup request is generated is caused to wait for execution, and a currently executed application is continuously executed.

"Running side standby"—A currently executed application is caused to wait for execution without being terminated, and an application for which a startup request is generated begins to be executed.

"Running side terminated"—A currently executed application terminates, and an application for which a startup request is generated begins to be executed.

In order from the highest priority to the lowest, the states are "Startup unachievable," "Interrupting side standby," "Running side standby," and "Running side terminated."

In accordance with the current state of a currently executed application and the current state of a conflicting application, the application management block 64 references the conflict condition table to detect the states to which the currently executed application and conflicting application should switch (startup unachievable, interrupting side standby, running side standby, running side terminated, etc.).

In accordance with the priorities of the state to which the currently executed application should switch and the state to which the conflicting application should switch, which are detected by the application management block 64, the application control block 65 places the currently executed application in the detected state for the currently executed application and the conflicting application in the detected state for the conflicting application.

The above flow will now be described with reference to the flowchart in FIG. 6. The application management block 64 performs step S5 to run the conflict check for the purpose of determination whether the application for which a startup request is generated (the interrupting side application) can be started.

If the result of the conflict check indicates that the interrupting side application cannot be started, it is impossible to start the interrupting side application. Therefore, the application management block 64 performs step S10 to cancel the startup request for the application designated by the startup request.

If, on the other hand, the result of the conflict check indicates that the interrupting side application can be started, the application management block 64 temporarily registers the determination results of the interrupting side application (application ID, application name, task ID, status, etc.) in a provisional list.

The determination results registered in the provisional list are retained until the conflict check is completed for all the applications registered in the application list 63. The provisional list is formed, for instance, in a predetermined area of the memory 13 or in a temporary storage area within the CPU 12.

When the conflict check is completed for all the applications registered in the application list 63, the application management block 64 detects the states to which the applications registered in the provisional list should switch. In accordance with the aforementioned state priorities ("Startup unachievable," "Interrupting side standby," "Running side standby," and "Running side terminated" in order from the highest priority to the lowest), the application management block 64 determines the states to which the conflicting applications should switch, and reflects the obtained result in the application list 63.

As a result, the execution list 61 for each of the currently executed applications, which includes an application identification number (application ID), application name, task identification number (task ID), status, and the like as shown in FIG. 8, and the execution wait list 62 for each of the applications waiting to be executed, which includes an application identification number (application ID), application name, task identification number (task ID), status, and the like as shown in FIG. 9, are formed within the application list 63.

The information indicating the state to which an application should switch, which is determined as described above, is registered as the status shown in FIGS. 8 and 9. For the telephone application, the information concerning, for instance, the connection state, communication state, and hold state is registered.

The number of applications registered in the execution list 61 or execution wait list 62 is not limited to one. If a plurality of applications are simultaneously executed or waiting to be executed, the application ID, application name, and the like are registered for each of the plurality of applications.

In steps S1, S2, and S4 to S9 in the flowchart in FIG. 6, the conflict check result is repeatedly registered in the provisional list until the conflict check is completed for all the applications registered in the application list 63, and the information registered in the provisional list is reflected in the application list 63 when the conflict check is completed for all the applications registered in the application list 63.

After the result in the provisional list is reflected in the application list 63, the application control block 65 performs step S10 to place an application registered in the execution list 61 within the application list 63 in an execution state and place an application registered in the execution wait list 62 in an execution wait state.

Subsequently, the application manager 25 waits to detect an application startup request, the termination of a currently executed application, or a state transition in a currently executed application. When any of these is detected, the application manager 25 executes the flowchart in FIG. 6 again.

(Conflict Management Exercised During Telephone Application Execution)

The above operation will now be described in detail with reference to an example in FIG. 7. As mentioned earlier, FIG. 7 shows an example of the conflict condition table that is referenced when the telephone application is currently executed.

If, for instance, a telephone application startup request is generated while a currently executed telephone application is in a connection state (first state), the conflict condition table 26 is referenced. The conflict condition table 26 reads "Startup unachievable" as shown in FIG. 7 because multiple instances of the telephone application should not run.

In the above instance, the application control block 65 cancels the generated telephone application startup request and allows the currently executed telephone application to be continuously executed.

However, if an e-mail creation request (or e-mail sender request) is generated while a currently executed telephone application is in the connection state (first state), the conflict condition table 26 reads "Interrupting side standby" when referenced. Therefore, the application management block 64 registers an e-mail application, which relates to the generated e-mail creation request, in the execution wait list 62 (the e-mail application is an interrupting side application in this instance) and causes the e-mail application to wait for execution.

If a motion picture player startup request is generated while the currently executed telephone application is a communication state (second state), the conflict condition table 26 reads "Startup achievable" when referenced. Therefore, the application management block 64 registers a motion picture player application in the execution list 61. Thus, the application control block 65 simultaneously executes the currently executed telephone application and the motion picture player application.

If an address book startup request is generated while the currently executed telephone application is in the connection state (first state), the conflict condition table 26 reads "Running side standby" when referenced. Therefore, the application management block 64 deregisters the currently executed telephone application from the execution list 61 to register it in the execution wait list 62, and then registers an address book application in the execution list 61.

Thus, the application control block 65 causes the currently executed telephone application to wait for execution, and executes the address book application, which relates to the generated startup request.

The foregoing concrete example description states that the application management block 64 directly rewrites the information registered in the application list 63 in accordance with a detection result based on the conflict condition table 26. In the present embodiment, however, the determination results are temporarily stored in the provisional list, and when the determination process is completed for all the applications, the contents of the provisional list are reflected in the application list 63.

(Conflict Management Exercised in the Event of a Conflict Between Address Book and Telephone Applications)

The captioned conflict management will now be described in detail with reference to sequence diagrams (timing diagrams) in FIGS. 10 and 11.

Figure 10:
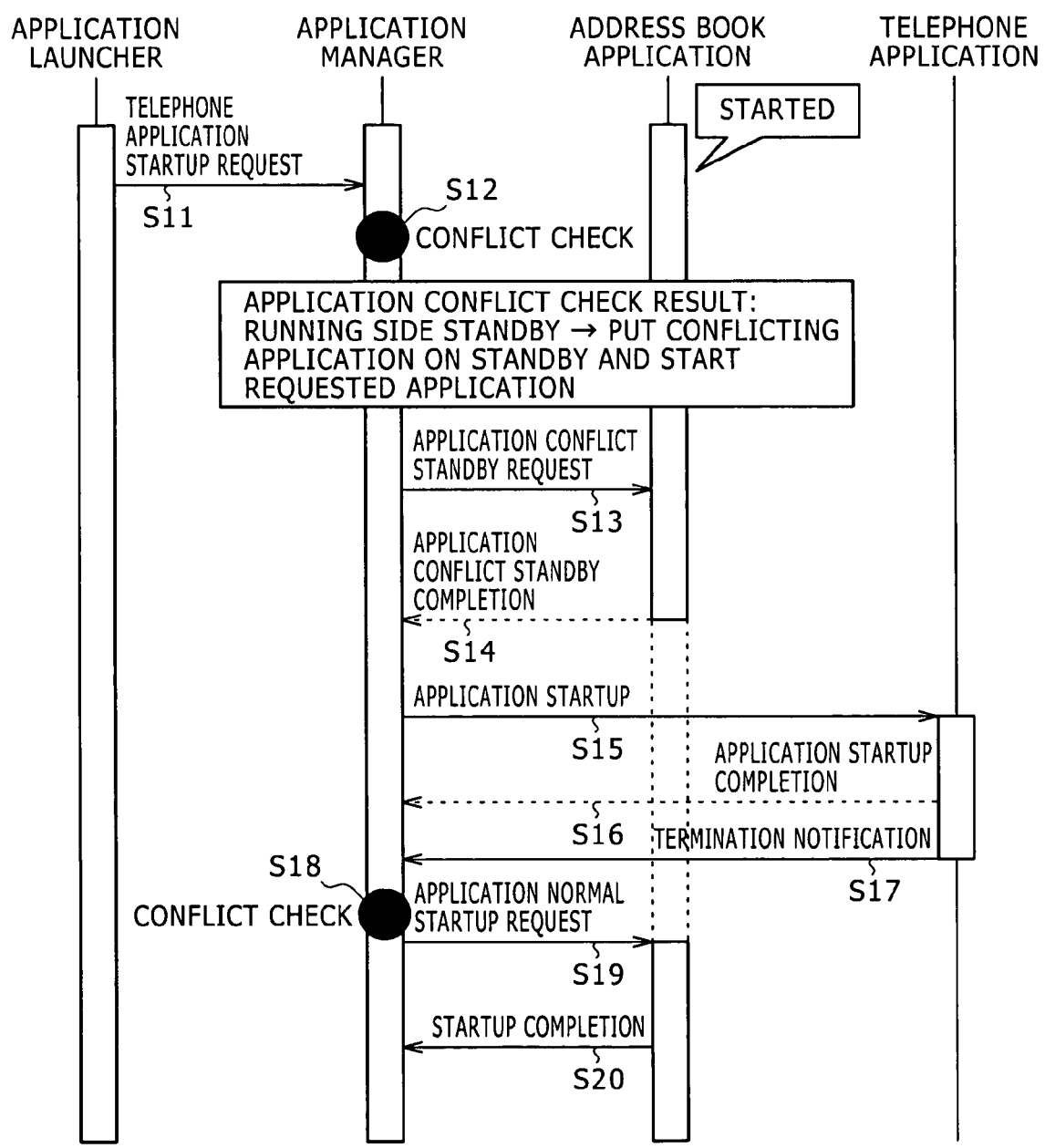
FIG. 10 is a timing diagram illustrating a conflict management operation that the application manager performs when a telephone application execution request is issued while an address book application is being executed.

FIG. 10 illustrates a conflict management process that is performed when a telephone application startup request is generated while the address book application is running.

The address book application is an application for registering, deleting, or otherwise editing, for instance, a call destination cellular phone number and cellular phone mail address that are stored in an address book storage area, which is provided in a predetermined area of the memory 13.

When, in step S11, the application launcher issues a telephone application startup request to the application manager 25 as indicated in FIG. 10, the application management block 64 of the application manager 25 performs step S12 to reference the conflict condition table 26, which has been described with reference to the example shown in FIG. 7, and conducts the aforementioned conflict check.

If, as a result of the conflict check, the address book application waits for execution to let the telephone application start (running side standby), the application management block 64 transmits a standby request for the currently executed address book application to the application control block 65.

Upon receipt of the standby request, the application control block 65 transmits the standby request to the currently executed address book application in step S13, thereby putting the address book application on standby.

When the address book application goes on standby, it performs step S14 to transmit "Standby completion" data to the application management block 64 via the application control block 65.

Upon receipt of the "Standby completion" data, the application management block 64 transmits a telephone application startup request to the application control block 65. Upon receipt of the startup request, the application control block 65 performs step S15 to transmit the startup request to the telephone application and start the telephone application.

Upon completion of startup, step S16 is performed so that the telephone application sends a startup completion notification to the application management block 64.

When the telephone application execution progresses and then terminates due, for instance, to the termination of a call, step S17 is performed so that the telephone application sends a termination notification to the application management block 64.

Upon receipt of the termination notification, the application management block 64 performs step S18 to reference a currently executed application and an application waiting to be executed that are registered in the application list 63, and conduct the aforementioned conflict check. If the result of the conflict check indicates that the address book application, which has been on standby, may be started, an address book application startup request is transmitted to the application control block 65.

Upon receipt of the startup request, the application control block 65 performs step S19 to exercise control for reexecuting the address book application that has been on standby. When the address book application is reexecuted due to reexecution control, the address book application performs step S20 to send a startup completion notification to the application management block 64.

Thus, the telephone application is executed in such a manner that an editing or other operation of the address book is interrupted. Further, the address book application is executed again after the termination of a call so that an editing or other operation of the address book is performed.

(Conflict Management Exercised in the Event of a Conflict Between E-mail and Telephone Applications)

FIG. 11 illustrates a conflict management process that is performed when an e-mail application startup request is generated while the telephone application is running.

The e-mail application is used, for instance, to send/receive cellular phone mail, delete or otherwise edit transmitted/received mail, or create cellular phone mail.

When, in step S21, the application launcher issues an e-mail application startup request to the application manager 25 as indicated in FIG. 11, the application management block 64 of the application manager 25 performs step S22 to reference the conflict condition table 26 and conducts the aforementioned conflict check.

If, as a result of the conflict check, the e-mail application for which the startup request is generated waits for execution to permit the continued execution of the telephone application (interrupting side standby), the application management block 64 transmits a standby request for the e-mail application designated by the startup request to the application control block 65.

Upon receipt of the standby request, the application control block 65 performs step S23 to put the e-mail application designated by the startup request on standby and continuously execute the telephone application, which is currently executed.

When the telephone application execution progresses and then terminates due, for instance, to the termination of a call, step S24 is performed so that the telephone application sends a termination notification to the application management block 64.

Upon receipt of the termination notification, the application management block 64 performs step S25 to reference a currently executed application and an application waiting to be executed that are registered in the application list 63, and conduct the aforementioned conflict check. If the result of the conflict check indicates that the e-mail application, which has been on standby, may be started, an e-mail application startup request is transmitted to the application control block 65.

Upon receipt of the startup request, the application control block 65 performs step S26 to exercise control for executing the e-mail application, which has been on standby. Thus, e-mail is transmitted, received, created, or otherwise handled after the termination of a call.

When a startup process for the e-mail application is completed, the e-mail application sends a startup completion notification to the application management block 64.

As is obvious from the above description, the cellular phone according to the present embodiment causes the application manager 25 to register a currently executed application in the execution list 61 within the application list 63 and register an application waiting for execution in the execution wait list 62.

When, for instance, the application manager 25 receives an application startup request, detects the termination of a currently executed application, or detects a state transition in a currently executed application, the application manager 25 references the execution list 61 and execution wait list 62, determines the application to be executed and the application that should wait to be executed, and exercise application conflict management for multi-tasking. Therefore, the following advantages are provided.

The current state of a currently executed application and the status of an application waiting for execution are referenced to comprehensively determine the currently executed application and the application waiting for execution and determine the application to be executed and the application that should wait for execution.

Therefore, it is possible to assure the resumption of the execution of an application waiting for execution.

When, for instance, the user issues an instruction for executing word-processing software while spreadsheet software is being executed, application conflict management in related art is exercised to preferentially handle the instruction for executing word-processing software and launch the word-processing software.

However, the cellular phone according to the present embodiment comprehensively determines a currently executed application and an application waiting for execution, and determines the application to be executed and the application that should wait for execution. Therefore, even when the user issues an instruction for executing the word-processing software, it is possible to prevent the word-processing software from starting if the spreadsheet software is in a predefined execution state. Thus, detailed application conflict management can be exercised.

Further, the application manager 25 references the application list 63 and conflict condition table 26 to determine the application to be executed and the application that should wait for execution. In other words, the application manager 25 determines whether or not applications should be executed.

As such being the case, an application can be programmed without having to consider a conflict with another application.

If a specification change occurs in a certain application in a situation where an application can be programmed without having to consider a conflict with another application, no other applications require any specification change.

Therefore, even when a specification change occurs in a certain application, it is possible to avoid a troublesome task. More specifically, it is not necessary to change the specifications for all the other applications accordingly or reprogram and reinstall a number of applications (for applying changes to application designs and implementations).

When an application is to be programmed for use in the cellular phone according to the present embodiment, it is not necessary to consider a conflict with another application. This feature makes software development considerably easy.

[Other Fields of Application]

The foregoing embodiment description assumes that the present invention is applied to a cellular phone. However, the present invention can also be applied to a PHS (Personal Handyphone System) phone, PDA (Personal Digital Assistant or Personal Data Assistant), or other mobile communication terminal or personal computer or other terminal device.

Further, the foregoing embodiment description also assumes that application conflict management is exercised. Alternatively, however, task conflict management may be exercised instead of application conflict management.

While the present invention has been described in conjunction with preferred embodiments, it should be understood that design and other modifications will become apparent to those of ordinary skill in the art and that such modifications are intended to be included within the scope of the present invention and the following claims.

In The Drawings

FIG. 1
6: CDMA signal processing section
7: Data code processing section

8: PCM code processing section
14: Operating control section
17: Power supply circuit
12: Control section (CPU)
15: Display section
13: Memory FIG. 2
26: Conflict condition table
Telephone application
Clock application
Screen saver
Application launcher
25: Application manager
42: Application framework
41: Window manager
40: Library
34: LCD driver
35: Key driver
36: Communication driver
37: Camera driver
38: Other hardware drivers
22: Memory/file system driver
14: Operating control section
30: Communication system
31: Handheld camera
32: Other hardware
21: Memory/file system FIG. 3
43: Application
52: User control block
51: System control block
50: Communication block FIG. 4
25: Application manager
Startup
Termination
State transition
65: Application control block
63: Application list
61: Execution list
62: Execution wait list
64: Application management block
60: Communication block FIG. 5
Execution states
First state
Third state
Second state
Fourth state
Standby
Execution wait state
Started
Started
Terminated
Started for standby
Dormant
Generated
Deleted
Nonexistent FIG. 6
START (start of conditional determination)
S1: Reference application list
S2: Application found in execution list?
S3: Add to execution list
S4: Reference conflict condition table for interrupting side application state A and running application state B
S5: Interrupting side application startup unachievable?
S6: Compare conflict condition priority values in provisional list and conflict condition table
S7: Reflect determination results in provisional list
S8: Checks of all listed applications completed?
S9: Reflect provisional list in application list
S10: Switch to state in accordance with conditional determination results
Wait for request FIG. 7
Status
First state
Second state
Third state
Fourth state
Nth state
Application
Telephone
Startup unachievable
Startup unachievable
Startup unachievable
Startup unachievable
Startup unachievable
Standby
Running side standby
Running side standby
Running side terminated
Running side terminated
Running side terminated
Address book
Running side standby
Running side standby
Running side standby
Running side standby
Running side terminated
E-mail
Interrupting side standby
Startup achievable
Running side standby
Running side standby
Running side terminated
Browser
Startup achievable
Startup achievable
Running side standby
Startup achievable
Running side terminated
Motion picture player
Startup achievable
Startup achievable
Running side standby
Running side standby
Startup achievable
Notepad
Startup achievable
Startup achievable
Running side standby
Running side terminated
Interrupting side standby FIG. 8
Execution list
Application ID
Application name
Task ID Status
Application ID
Application name
Task ID
Status
Application ID
Application name
Task ID
Status FIG. 9
Execution list
Application ID
Application name
Task ID
Status
Application ID
Application name
Task ID
Status
Application ID
Application name
Task ID
Status FIG. 10
Application launcher
Application manager
Address book application
Telephone application
S11: Telephone application startup request
S12: Conflict check
Started
Application conflict check result: Running side standby ->
 Put conflicting application on standby and start requested application
S13: Application conflict standby request
S14: Application conflict standby completion
S15: Application startup
S16: Application startup completion
S17: Termination notification
S18: Conflict check
S19: Application normal startup request
S20: Startup completion FIG. 11
Application launcher
Application manager
E-mail application
Telephone application
S21: E-mail application startup request
S22: Conflict check
Application conflict check result: Interrupting side standby ->
 Put conflicting application on standby
S23: Application conflict standby request
S24: Application termination notification
S25: Conflict check
S26: E-mail application startup
S27: Startup completion

The invention claimed is:

1. A computer-readable conflict management program embodied on a computer readable memory device that is to be executed by a computer of a portable terminal device, the conflict management program when executed perform:
  receiving one of (a) a start task execution request, (b) a termination notification of a currently executed task and (c) a state transition notification of a currently executed task;
  registering an active task in an active task list in a memory;
  detecting for a task conflict, to determine whether the task which issued the start task execution request can be started and whether a task waiting to be executed can be started, by referencing the active task list when the start task execution request is received in the reception step;
  determining a state to which the task designated by the start task execution request should switch and the state to which a currently executed task registered in the active task list should switch in accordance with predetermined conditions set in a conflict condition table when a task conflict is detected in the conflict detection step, wherein the states including a startup unachievable state, a startup achievable state, a running side standby state, a running side terminated state and an interrupting side standby state; and
  respectively placing the task designated by the start task execution request and the currently executed task registered in the active task list in the states determined in the state determination step.

2. The computer-readable conflict management program according to claim 1, wherein the state determination step comprises:
  referencing, when a task conflict is detected in the conflict detection step, the conflict condition table that stores states to which conflicting tasks should switch; and
  determining respectively the state to which the task designated by the start task execution request should switch and the state to which the currently executed task registered in the active task list should switch.

3. The computer-readable conflict management program according to claim 2, wherein the active task registration step comprises:
  registering the task to be executed in an execution list within the active task list; and
  registering the task that should wait for execution in an execution wait list within the active task list.

4. The computer-readable conflict management program according to claim 3, wherein the active task registration step comprises:
  selecting the task to be executed and the task that should wait for execution in accordance with the priorities of the states determined in the determination step;
  registering the task to be executed in the execution list; and
  registering the task that should wait for execution in the execution wait list.

5. The computer-readable conflict management program according to claim 2, wherein the state determination step comprises:
  canceling the start task execution request when it is determined that the task designated by the start task execution request cannot be executed.

6. A computer readable storage medium for storing a computer-readable conflict management program that is to be executed by a computer of a portable terminal device and causing the computer to perform the steps of:
  receiving one of (a) a start task execution request, (b) a termination notification of a currently executed task and (c) a state transition notification of a currently executed task;
  registering an active task in an active task list in a memory;
  detecting for a task conflict, to determine whether the task which issued the start task execution request can be started and whether a task waiting to be executed can be started, by referencing the active task list when the start task execution request is received in the reception step;

determining a state to which a task designated by the start task execution request should switch and the state to which a currently executed task registered in the active task list should switch in accordance with predetermined conditions set in a conflict conditional table for each task when a task conflict is detected in the conflict detection step, wherein the states including a startup unachievable state, a startup achievable state, a running side standby state, a running side terminated state and an interrupting side standby state; and respectively placing the task designated by the start task execution request and the currently executed task registered in the active task list in the states determined in the state determination step.

7. The storage medium according to claim 6, wherein the state determination step comprises:

referencing, when a task conflict is detected in the conflict detection step, the conflict condition table that stores states to which conflicting tasks should switch; and determining respectively the state to which the task designated by the start task execution request should switch and the state to which the currently executed task registered in the active task list should switch.

8. The storage medium according to claim 7, wherein the active task registration step comprises:

registering the task to be executed in an execution list within the active task list; and registering the task that should wait for execution in an execution wait list within the active task list.

9. The storage medium according to claim 8, wherein the active task registration step comprises:

selecting the task to be executed and the task that should wait for execution in accordance with the priorities of the states determined in the determination step;

registering the task to be executed in the execution list; and registering the task that should wait for execution in the execution wait list.

10. The storage medium according to claim 7, wherein the state determination step comprises:

canceling the start task execution request when it is determined that the task designated by the start task execution request cannot be executed.

11. A conflict management method executed by a computer of a portable terminal device comprising the steps of:

receiving one of (a) a start task execution request, (b) a termination notification of a currently executed task and (c) a state transition notification of a currently executed task;

registering an active task in an active task list in a memory;

detecting for a task conflict, to determine whether the task which issued the start task execution request can be started and whether a task waiting to be executed can be started, by referencing the active task list when the start task execution request is received in the reception step;

determining a state to which the task designated by the start task execution request should switch and the state to which a currently executed task registered in the active task list should switch in accordance with predetermined conditions set in a conflict condition table for each task when a task conflict is detected in the conflict detection step, wherein the states including a startup unachievable state, a startup achievable state, a running side standby state, a running side terminated state and an interrupting side standby state; and respectively placing the task designated by the start task execution request and the currently executed task registered in the active task list in the states determined in the state determination step.

12. The conflict management method according to claim 11, wherein the state determination step comprises:

referencing, when a task conflict is detected in the conflict detection step, the conflict condition table that stores states to which conflicting tasks should switch; and determining respectively the state to which the task designated by the start task execution request should switch and the state to which the currently executed task registered in the active task list should switch.

13. The conflict management method according to claim 12, wherein the active task registration step comprises:

registering the task to be executed in an execution list within the active task list; and registering the task that should wait for execution in an execution wait list within the active task list.

14. The conflict management method according to claim 13, wherein the active task registration step comprises:

selecting the task to be executed and the task that should wait for execution in accordance with the priorities of the states determined in the determination step;

registering the task to be executed in the execution list; and registering the task that should wait for execution in the execution wait list.

15. The conflict management method according to claim 12, wherein the state determination step comprises:

canceling the start task execution request when it is determined that the task designated by the start task execution request cannot be executed.

16. An electronic portable terminal apparatus comprising:

execution request receiver means for receiving one of (a) a start task execution request, (b) a termination notification of a currently executed task and (c) a state transition notification of a currently executed task;

active task registration means for registering an active task in an active task list in a memory;

conflict detection means for determining whether the task which issued the start task execution request can be started and whether a task waiting to be executed can be started by referencing the active task list to detect for a task conflict when the start task execution request is received by the execution request receiver means;

transition state determination means for determining a state to which a task designated by the start task execution request should switch and the state to which a currently executed task registered in the active task list should switch in accordance with predetermined conditions set in a conflict condition table for each task when a task conflict is detected by the conflict detection means, wherein the states including a startup unachievable state, a startup achievable state, a running side standby state, a running side terminated state and an interrupting side standby state; and state transition means for respectively placing the task designated by the start task execution request and the currently executed task registered in the active task list in the states determined by the transition state determination means.

17. The electronic apparatus according to claim 16, further comprising:

the conflict condition table that stores states to which conflicting tasks should switch, wherein when a task conflict is detected by the conflict detection means, the transition state determination means references the conflict condition table, and determines the state to which a task designated by the start task execution request should switch and the state to which the currently executed task registered in the active task list should switch.

18. The electronic apparatus according to claim 17, wherein the active task registration means registers the task to be executed in an execution list within the active task list and registers the task that should wait for execution in an execution wait list within the active task list.

19. The electronic apparatus according to claim 18, wherein the active task registration means selects the task to be executed and the task that should wait for execution in accordance with the priorities of the states determined by the transition state determination means, registers the task to be executed in the execution list, and registers the task that should wait for execution in the execution wait list.

20. The electronic apparatus according to claim 17, wherein the transition state determination means cancels the start task execution request when it is determined that the task designated by the start task execution request cannot be executed.

* * * * *